United States Patent
Steinhauer et al.

(10) Patent No.: US 10,742,512 B2
(45) Date of Patent: Aug. 11, 2020

(54) SYSTEM AND METHOD FOR MULTICAST MAPPING

(71) Applicant: Singlewire Software, LLC, Madison, WI (US)

(72) Inventors: Jerome A. Steinhauer, Madison, WI (US); Ryan William Fowler, Edwards, CO (US); Vincent James Pizzo, San Bruno, CA (US); Laurence G. McGuire, Stoughton, WI (US); Kenneth W. Bywaters, Auburn, CA (US)

(73) Assignee: Singlewire Software, LLC, Madison, WI (US)

( * ) Notice: Subject to any disclaimer, the term of this patent is extended or adjusted under 35 U.S.C. 154(b) by 0 days.

(21) Appl. No.: 16/044,195

(22) Filed: Jul. 24, 2018

(65) Prior Publication Data

US 2019/0028354 A1 Jan. 24, 2019

Related U.S. Application Data

(60) Provisional application No. 62/536,325, filed on Jul. 24, 2017.

(51) Int. Cl.
*H04L 12/24* (2006.01)
*H04L 12/18* (2006.01)
*H04L 12/26* (2006.01)

(52) U.S. Cl.
CPC .............. *H04L 41/12* (2013.01); *H04L 12/18* (2013.01); *H04L 12/185* (2013.01);
(Continued)

(58) Field of Classification Search
CPC ....... H04L 41/12; H04L 12/18; H04L 12/185; H04L 12/1895; H04L 43/10; H04L 67/26; H04L 29/08693; H04N 21/26616
See application file for complete search history.

(56) References Cited

U.S. PATENT DOCUMENTS 7,342,888 B2  3/2008 Sengodan
7,454,518 B1 * 11/2008 Cain ................... H04L 12/1854
                                                    709/227

(Continued)

OTHER PUBLICATIONS

Proceedings of the Eighth IEEE International Symposium on Multimedia (ISM'06), Dewan Tanvir Ahmed and Shervin Shirmohammadi, BM-ALM: An Application Layer Multicasting with Behavior Monitoring, INSPEC Accession No. 9352702 (Year: 2006).*

*Primary Examiner* — John A Follansbee
*Assistant Examiner* — Fadi Haj Said
(74) *Attorney, Agent, or Firm* — Michael Best & Friedrich LLP

(57) ABSTRACT

System and method for multicast mapping. The system and method include a plurality of peripheral devices and a mapping server communicating with the plurality of peripheral devices over a communication network. An electronic processor of the mapping server provide a first block of information to a first peripheral device and instruct the first peripheral device to multicast the first block of information. The electronic processor receives response information from a plurality of peripheral devices. The electronic processor adds a second peripheral device to a sub-network of the first peripheral device when the response information from the second peripheral device includes the first block of information.

20 Claims, 7 Drawing Sheets

(52) U.S. Cl.
CPC ........ *H04L 12/1895* (2013.01); *H04L 41/085* (2013.01); *H04L 41/14* (2013.01); *H04L 43/10* (2013.01)

(56) References Cited

U.S. PATENT DOCUMENTS

| | | | | |
|---|---|---|---|---|
| 8,995,275 | B1* | 3/2015 | Iovine | H04L 45/16 370/228 |
| 9,154,371 | B1* | 10/2015 | Srinivasan | H04L 41/00 |
| 9,369,473 | B2* | 6/2016 | Janakiraman | H04L 63/101 |
| 9,813,920 | B2* | 11/2017 | Abraham | H04W 24/00 |
| 2002/0133615 | A1* | 9/2002 | Satran | H04L 1/1854 709/237 |
| 2004/0088309 | A1* | 5/2004 | Koh | H04L 12/1836 |
| 2005/0041674 | A1* | 2/2005 | Rooney | H04L 12/18 370/401 |
| 2007/0127421 | A1* | 6/2007 | D'Amico | H04W 72/005 370/338 |
| 2007/0160046 | A1* | 7/2007 | Matta | H04L 12/1868 370/390 |
| 2007/0220558 | A1* | 9/2007 | Jung | H04W 68/00 725/62 |
| 2008/0082632 | A1* | 4/2008 | Inagaki | H04L 1/1835 709/219 |
| 2011/0164615 | A1* | 7/2011 | Ito | H04L 29/12113 370/390 |
| 2011/0249817 | A1* | 10/2011 | Park | H04L 9/0822 380/281 |
| 2011/0280241 | A1* | 11/2011 | Field | H04L 12/185 370/390 |
| 2013/0250810 | A1* | 9/2013 | Ho | H04L 41/12 370/255 |
| 2013/0308637 | A1* | 11/2013 | Han | H04L 12/4633 370/390 |
| 2013/0326070 | A1* | 12/2013 | Wang | H04L 45/16 709/227 |
| 2014/0016560 | A1* | 1/2014 | Hunkeler | H04L 45/34 370/328 |
| 2014/0214939 | A1* | 7/2014 | Tallinger | G06F 3/1218 709/204 |
| 2014/0348022 | A1* | 11/2014 | Jain | H04L 12/185 370/254 |
| 2015/0074741 | A1* | 3/2015 | Janakiraman | H04L 63/101 726/1 |
| 2015/0230063 | A1* | 8/2015 | Chandramouli | H04W 4/70 455/466 |
| 2016/0127269 | A1* | 5/2016 | Wijnands | H04L 49/201 370/390 |
| 2016/0142247 | A1* | 5/2016 | Dumet | H04L 41/082 709/221 |
| 2018/0018229 | A1* | 1/2018 | Bestler | G06F 3/0619 |
| 2018/0041555 | A1* | 2/2018 | Manohar | H04L 12/44 |
| 2019/0020489 | A1* | 1/2019 | Moreno | H04L 12/4633 |

* cited by examiner

SYSTEM AND METHOD FOR MULTICAST MAPPING

RELATED APPLICATIONS

The present application claims priority to U.S. Provisional Patent Application No. 62/536,325, filed Jul. 24, 2017, the entire contents of which is hereby incorporated by reference.

BACKGROUND

Many commercial and public facilities (for example, buildings and campuses) use a mass notification system to warn and direct people during certain safety incidents, such as a weather advisory, a fire alarm, or the like. The mass notification system includes providing an audio, video, or text alert through peripheral devices on the building or campus's network.

DETAILED DESCRIPTION

Figure 1:
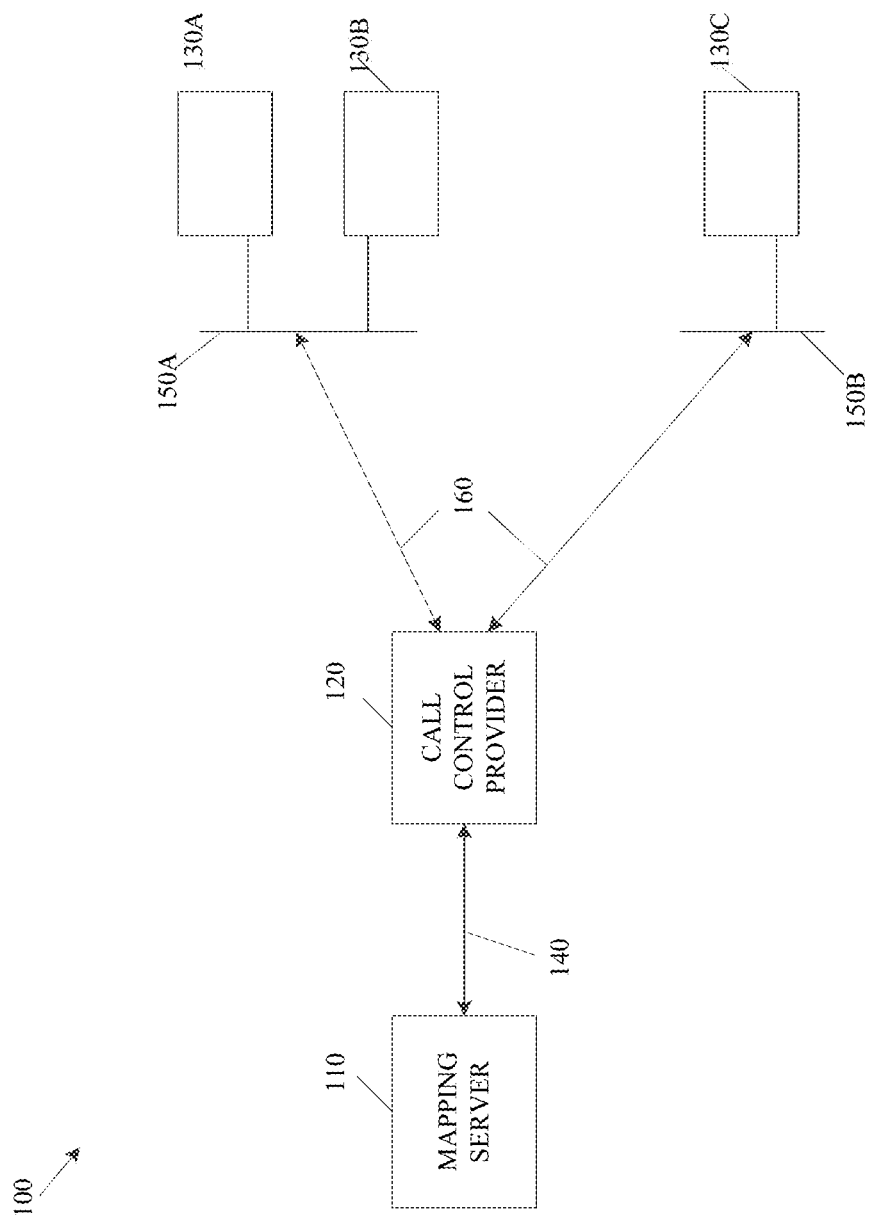
FIG. 1 is a block diagram of a system for multicast mapping in accordance with some embodiments.

In facilities where all peripheral devices are connected over a single network and/or sub-network, an originating device multicasts a message to all the peripheral devices over the network. The peripheral devices then render the message synchronously. However, most facilities now include more than one network or sub-network that the peripheral devices are connected to. Further, firewalls, the public Internet and other security protocols may block certain communications (for example, multicast communications) to a peripheral device. As such, each peripheral device may not be directly accessible to the originator device. However, in most cases, this peripheral device may be accessible from other non-originating devices on the local network.

In addition, due to the complex routing between devices the message may not be rendered at the same time. For example, a notification speaker and an IP telephone that are connected over different sub-networks may be out-of-sync when delivering the same audio message. In this instance, people in the facility may not be able to clearly make out the message rendered.

In order to implement a mass notification system in which an originating device can access every peripheral device, the network administrator may need to change the network or risk not reaching some peripheral devices. As such, a system is needed that automatically maps a network system of the facility and renders messages in synchrony.

One embodiment provides a system for multicast mapping including a plurality of peripheral devices, and a mapping server communicating with the plurality of peripheral devices over a communication network. The mapping server includes a memory and an electronic processor coupled to the memory. The electronic processor is configured to provide a first block of information to a plurality of peripheral devices and provide a second block of information to a first peripheral device selected from the plurality of peripheral devices. The electronic processor is also configured to instruct the first peripheral device to multicast the second block of information and receive response information from the plurality of peripheral devices. The electronic processor is further configured to determine that the response information received from a second peripheral device selected from the plurality of peripheral devices includes the second block of information and add the first peripheral device and the second peripheral device to a first sub-network in a multicast map. The electronic processor is also configured to determine that response information received from a third peripheral device selected from the plurality of peripheral devices does not include the second block of information and add the third peripheral device to a second sub-network in the multicast map. The electronic processor is further configured to store the multicast map in the memory.

Another embodiment provides a method for multicast mapping including providing, with an electronic processor, a first block of information to a plurality of peripheral devices and providing, with the electronic processor, a second block of information to a first peripheral device selected from the plurality of peripheral devices. The method also includes instructing, with the electronic processor, the first peripheral device to multicast the second block of information and receiving, with the electronic processor, response information from the plurality of peripheral devices. The method further includes determining, with the electronic processor, that response information received from a second peripheral device selected from the plurality of peripheral devices includes the second block of information and adding, with the electronic processor, the first peripheral device and the second peripheral device to a first sub-network in a multicast map. The method also includes determining, with the electronic processor, that response information received from a third peripheral device selected from the plurality of peripheral devices does not include the second block of information and adding, with the electronic processor, the third peripheral device to a second sub-network in the multicast map. The method further includes storing, with the electronic processor, the multicast map in a memory of a mapping server.

FIG. 1 is a block diagram of a system 100 for multicast mapping. The system 100 includes a mapping server 110, a call control provider 120, and a plurality of peripheral devices 130A though 130C. The plurality of peripheral devices 130A through 130C may singularly be referred to as a peripheral device 130 and may collectively be referred to as peripheral devices 130. The call control provider 120 may be, for example, a phone service provider, an internet service provider, or the like that provides voice over Internet protocol, telephone, and/or Internet services to the peripheral devices 130. The mapping server 110 communicates with the call control provider 120 over a public or private communication link 140. In some implementations, more than one call control provider 120 may provide services to the peripheral devices 130. In these embodiments, the mapping server 110 communicates with the plurality of call control providers 120 over the communication link 140.

The peripheral devices 130 may be part of one or more sub-networks 150A through 150B (for example, a subnet). The sub-networks 150A through 150B may singularly be referred to as sub-network 150 and collectively be referred to as sub-networks 150. The peripheral devices 130 communicate with the call control provider 120 over the sub-networks 150 and communication network 160. The communication link 140 and the communication network 160 may be implemented using a wired or wireless communication network, such as a cellular network, a telephone network, the public Internet, a private VPN, a fiber optics network, or the like. The sub-networks 150 may be implemented using a local wired or wireless communication network such as, a local area network (LAN), a wide area network (WAN), a Bluetooth® network, a Wi-Fi™, or the like.

FIG. 1 illustrates only one exemplary embodiment of the system 100. The system 100 may include more or fewer components and may perform functions other than those explicitly described herein. For example, in some embodiments, the system 100 may include more peripheral devices 130 connected over more sub-networks 150. In some embodiments, the mapping server 110 and the call control provider 120 may be implemented using the same system or the call control provider 120 may not be required.

Figure 2:
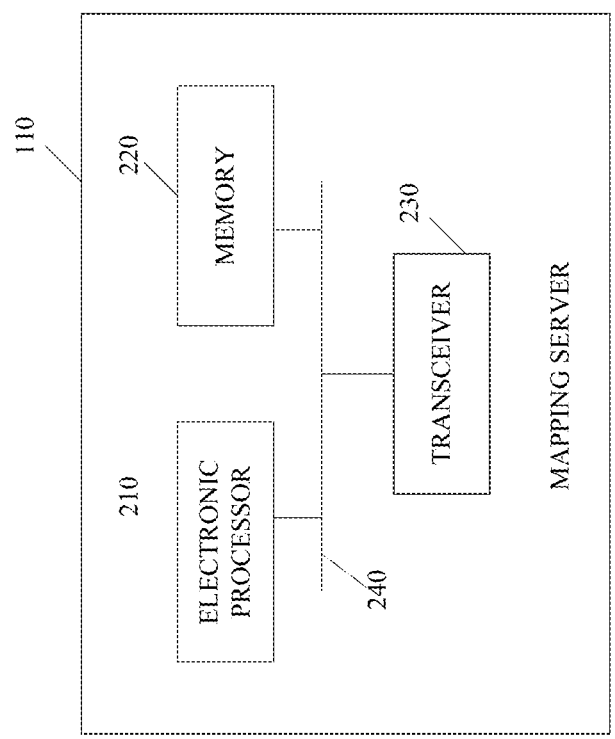
FIG. 2 is a block diagram of a mapping server of the system of FIG. 1 in accordance with some embodiments.

FIG. 2 is a block diagram of the mapping server 110. The mapping server 110 may be, for example, an application server, or the like hosted by a multicast mapping server provider and providing a multicast and/or an emergency notification service to facilities. In the example illustrated, the mapping server 110 includes an electronic processor 210, a memory 220, and a transceiver 230. The electronic processor 210, the memory 220, and the transceiver 230 communicate over one or more control and/or data buses (for example, a communication bus 240). FIG. 2 illustrates only one exemplary embodiment of the mapping server 110. The mapping server 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or modified accordingly. In the example illustrated, the memory 220 includes non-transitory, computer-readable memory that stores instructions that are received and executed by the electronic processor 210 to carry out the functionality of the mapping server 110 described herein. The memory 220 may include, for example, a program storage and a data storage. The program storage and the data storage may include combinations of different types of memory, such as read-only memory and random access memory.

The transceiver 230 enables wired and wireless communication between the mapping server 110, the call control provider 120, and/or the peripheral devices 130 over the communication link 140. In some implementations, rather than the transceiver 230, the mapping server 110 may include separate transmitting and receiving components, for example, a transmitter and a receiver.

Figure 3:
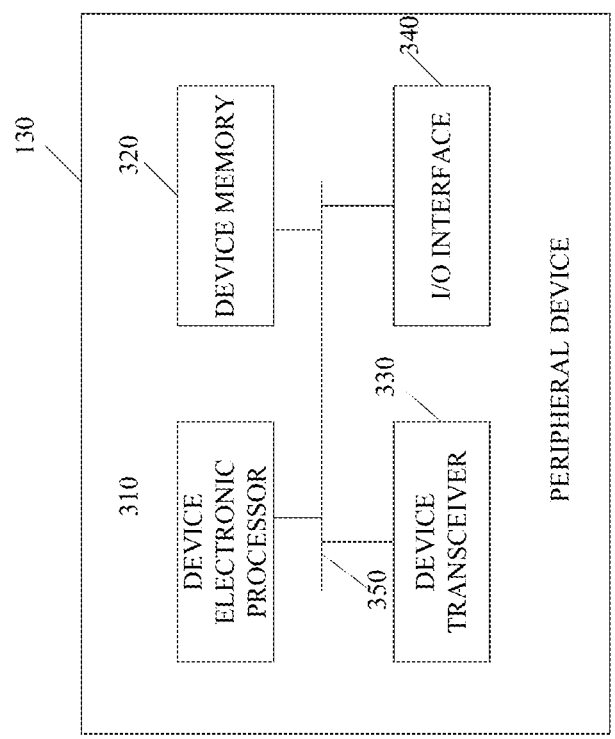
FIG. 3 is a block diagram of a peripheral device of the system of FIG. 1 in accordance with some embodiments.

FIG. 3 is a block diagram of the peripheral device 130. The peripheral device 130 may be, for example, a desk telephone, a web console, a smart telephone running an application, an internet protocol speaker, an internet protocol clock, an analog paging device, a computer desktop, an electronic device running an e-mail application or a social media application, or the like. In the example illustrated, the peripheral device 130 includes a device electronic processor 310, a device memory 320, a device transceiver 330, and an input/output interface 340. The device electronic processor 310, the device memory 320, the device transceiver 330, and the input/output interface 340 communicate over one or more control and/or data buses (for example, a device communication bus 350. FIG. 3 illustrates only one exemplary embodiment of the peripheral device 130. The peripheral device 130 may include more or fewer components and may perform functions other than those explicitly described herein.

The device electronic processor 310 may be implemented in various ways including ways that are similar to those described above with respect to the electronic processor 210. Likewise, the device memory 320 may be implemented in various ways including ways that are similar to those described above with respect to the memory 220. The device memory 320 may store instructions that are received and executed by the device electronic processor 310 to carry out the functionality of the peripheral device 130 described herein.

The device transceiver 330 enables wired and wireless communication from the peripheral device 130 to, for example, the mapping server 110, the call control provider 120, or other peripheral devices 130 over the sub-networks 150 and the communication network 160. In other implementations, rather than a device transceiver 330, the peripheral device 130 may include separate transmitting and receiving components, for example, a transmitter, and a receiver.

As noted above, the peripheral device 130 may include the input/output interface 340. The input/output interface 340 may include one or more input mechanisms (for example, a microphone, a touch screen, a keypad, a button, a knob, or the like), one or more output mechanisms (for example, a display, a printer, a speaker, and the like), or a combination thereof. The input/output interface 340 receives input from a user, provides output to a user, or a combination thereof. In some embodiments, as an alternative or in addition to managing inputs and outputs through the input/output interface 340, the peripheral device 130 may receive user input, provide user output, or both by communicating with an external device, such as a console computer, over a wired or wireless connection.

Figure 4:
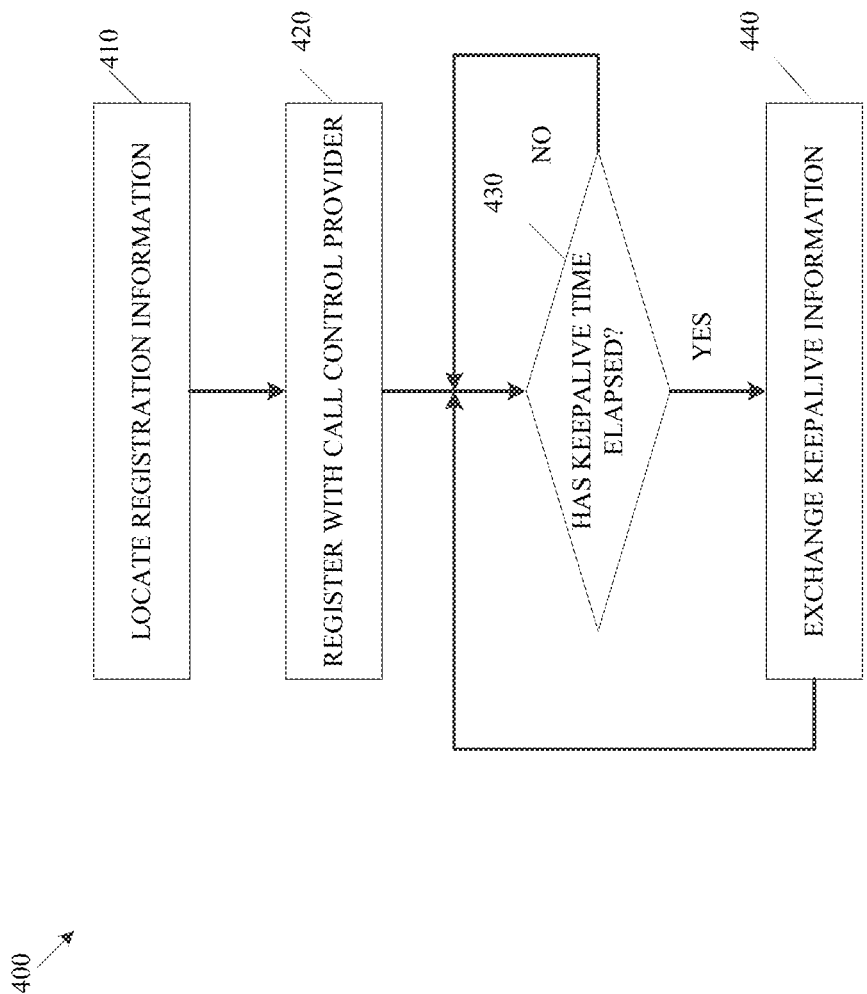
FIG. 4 is a flowchart of a method of registration and keepalive communication between a peripheral device and a call control provider of FIG. 1 in accordance with some embodiments.

FIG. 4 is a flowchart illustrating one example method 400 of registration and keepalive communication between a peripheral device 130 and the call control provider 120. The method 400 may be, for example, a service initiation protocol (SIP) implemented between the peripheral device 130 and the call control provider 120. As illustrated in FIG. 4, when the peripheral device 130 boots up, the method 400 includes locating, with the device electronic processor 310, registration information (at block 410) for registering with the call control provider 120. The peripheral device 130 may locate the registration information using, for example, a service location protocol (SLP). The registration information may include a port and an IP address of the call control provider 120. The registration information may also include authentication information (for example, password) to authenticate the peripheral device 130 with the call control provider 120.

The method 400 also includes registering the peripheral device 130 with the call control provider 120 (at block 420). The peripheral device 130 may provide the authentication information to the call control provider 120 to register with the call control provider 120. When the registration is successful, the peripheral device 130 may receive an acknowledgement (ACK) from the call control provider 120. When the registration is unsuccessful, the peripheral device 130 may receive a negative acknowledgement (NACK) from the call control provider 120 and the peripheral device 130 may re-attempt to register with the call control provider 120.

Once the peripheral device 130 is registered, the method 400 may include the peripheral device 130 and the call control provider 120 continuously exchanging keepalive information to keep the communication channels open. The method 400 includes determining, with the mapping server 110, whether a keepalive time has elapsed (at block 430). The keepalive time may be a predetermined time interval at which the peripheral device 130 and the call control provider 120 exchange keepalive information. When the keepalive time has elapsed, the method 400 includes the peripheral device 130 and the call control provider 120 exchanging keepalive information (at block 440). Keepalive information may be for example, a particular block of information provided to the peripheral device 130 during the registration or during a previous keepalive communication.

Figure 5:
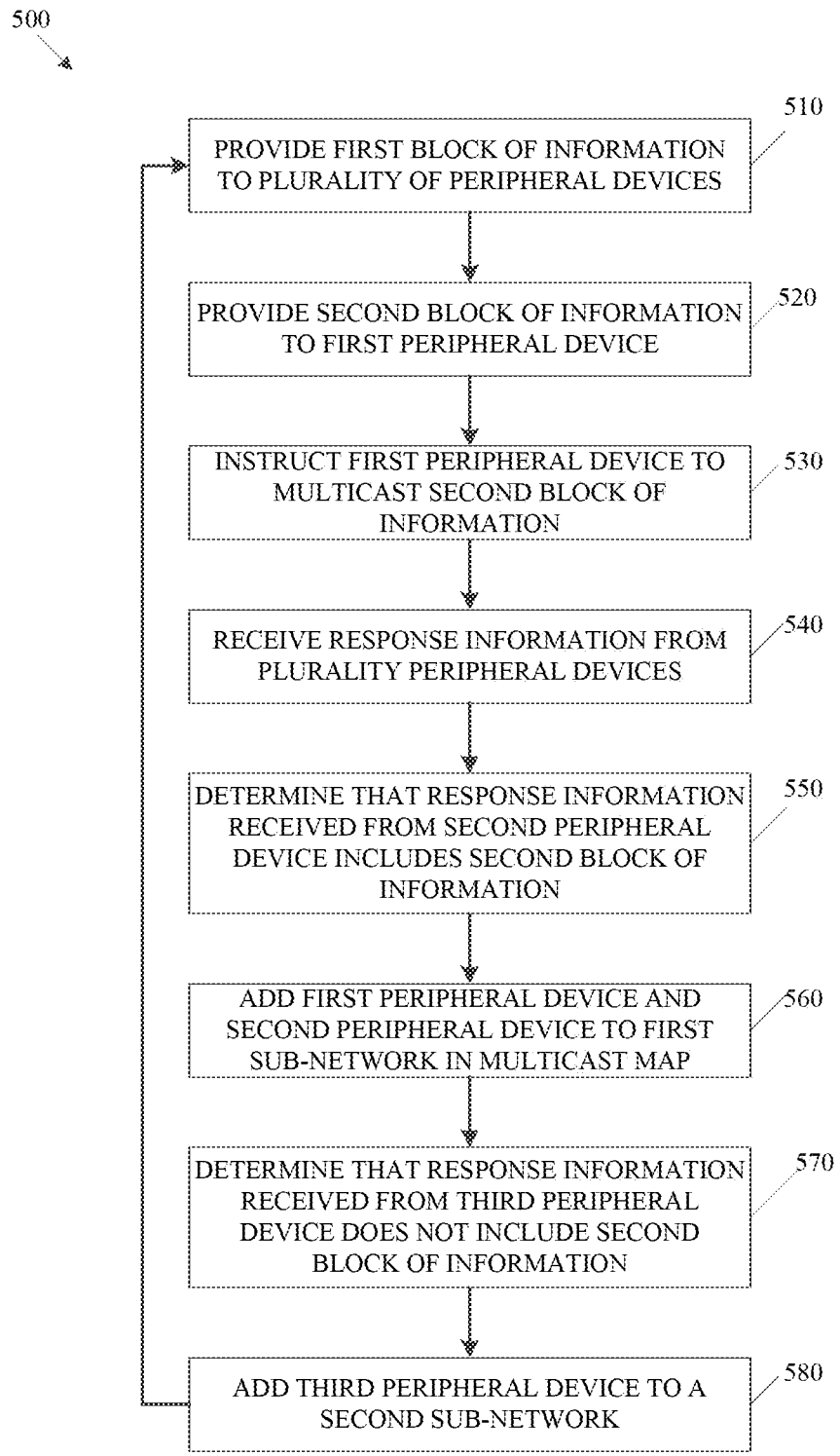
FIG. 5 is a flowchart of a method of multicast mapping in accordance with some embodiments.

FIG. 5 is a flowchart illustrating one example method 500 of multicast mapping. As illustrated in FIG. 5, the method 500 includes providing, with the electronic processor 210, a first block of information to a plurality of peripheral devices 130 (at block 510). The first block of information may be provided through the registration information or during a keepalive information exchange between the call control provider 120 and the peripheral devices 130. The first block of information may be, for example, an 8 byte group ID. This group ID may serve to recognize peripheral devices 130 as belonging to a particular facility or entity.

The method 500 also includes providing, with the electronic processor 210, a second block of information to a first peripheral device 130 (at block 520). The first peripheral device 130 is, for example, the peripheral device 130A. The second block information may be another 8 bytes of unique data (for example, testing IDs) for testing the network connections of the system 100. The method 500 then includes instructing, with the electronic processor 210, the first peripheral device 130A to multicast the second block of information (at block 530). The first peripheral device 130A multicasts the second block of information, for example, over the sub-network 150A such that a plurality of peripheral devices 130 (for example, a second plurality of peripheral devices 130) connected to the sub-network 150A receive the second block of information.

The method 500 further includes receiving, with the electronic processor 210, response information from the plurality of peripheral devices 130 (at block 540). For example, the mapping server 110 and/or the call control provider 120 receive the response information from the peripheral devices 130, which include all the blocks of information received by the peripheral device. In some embodiments, the response information may be keepalive information received by the mapping server 110 and/or call control provider 120 from the peripheral device. The keepalive information may include all the blocks of information received by the peripheral devices 130. The method 500 then includes determining, with the electronic processor 210, that the response information received from a second peripheral device 130 includes second block of information (at block 550). The second peripheral device 130 is, for example, the peripheral device 130B. Since the second peripheral device 130B is on the same sub-network 150 as the first peripheral device 130A, the second peripheral device 130B may have received the second block of information.

When the electronic processor 210 determines that the response information received from the second peripheral device 130B includes the second block of information, the method 500 includes adding, with the electronic processor 210, the first peripheral device 130A and the second peripheral device 130B to a first sub-network 150A in a multicast map (at block 560). The electronic processor 210 accordingly determines that a multicast from the first peripheral device 130A will be received on the second peripheral device 130B even if the second peripheral device 130B may not receive a unicast message or multicast message from other peripheral devices 130. The multicast map may be stored in the memory 220 and continually updated based on the method 500.

The method 500 also includes determining, with the electronic processor 210, that response information received from a third peripheral device 130 does not include the second block of information (at block 570). The third peripheral device 130 is, for example, the peripheral device 130C. Accordingly, the electronic processor 210 determines that the third peripheral device 130C is not on the same sub-network 150 as the first peripheral device 130A. When the electronic processor 210 determines that the response information received from the third peripheral device 130C does not include the second block of information, the method 500 includes adding, with the electronic processor 210, the third peripheral device 130C to a second sub-network 150B in a multicast map (at block 560).

The method 500 may repeat multicasting blocks of information between peripheral devices 130 and checking response and/or keepalive information of peripheral devices 130 until a complete multicast map of the system 100 is created. In addition, the method 500 may repeat periodically to update the multicast map, for example, every 12 hours, when a new device is added to the system 100, when devices are disconnected, or the like.

Figure 6:
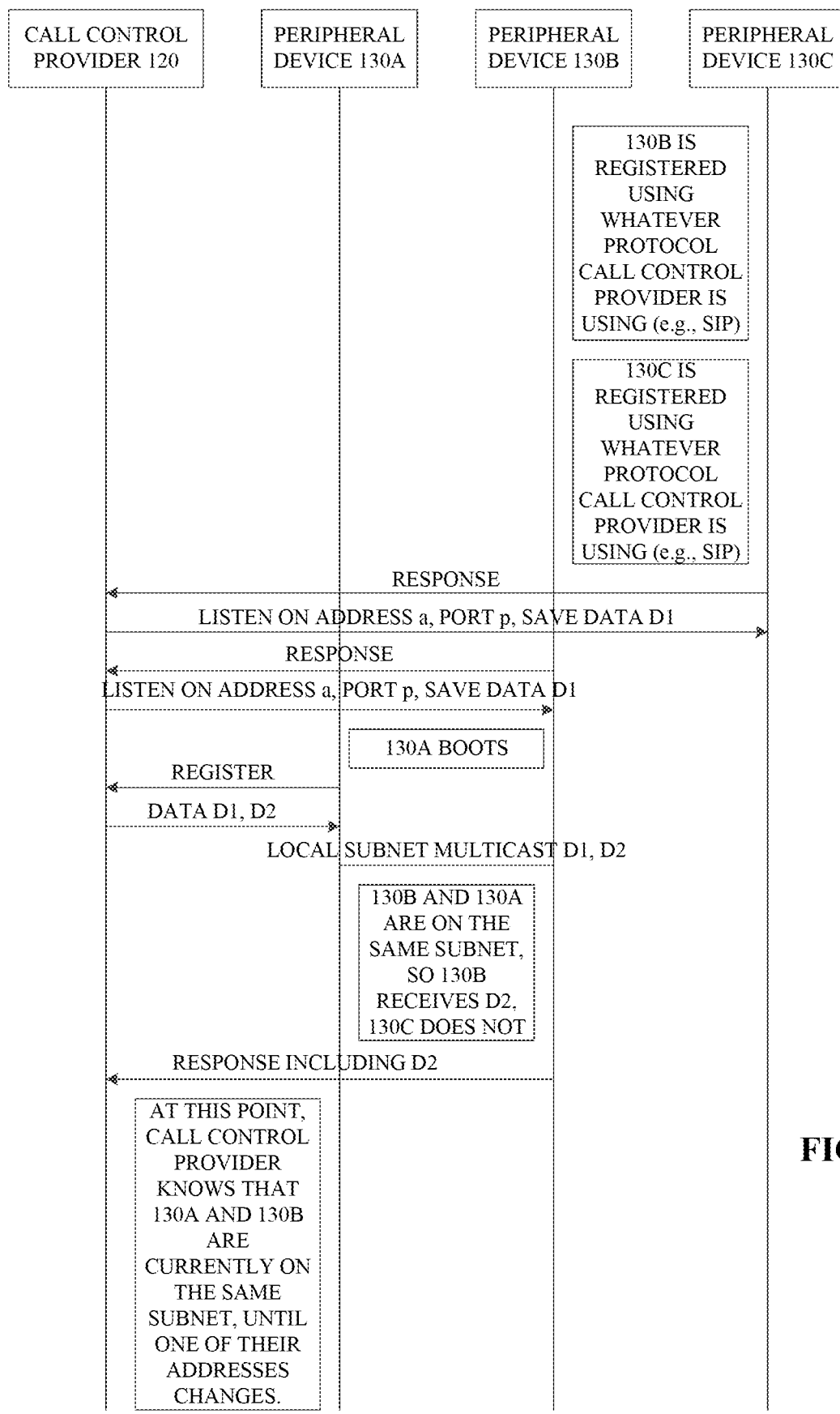
FIG. 6 is a flow diagram illustrating the exchange of information between the peripheral devices and the call control provider of FIG. 1 in accordance with some embodiments.

For example, FIG. 6 is an operation flow diagram illustrating the multicast mapping method 500. Peripheral devices 130B and 130C exchange response and/or keepalive information with the call control provider 120. When peripheral device 130A boots, the peripheral device 130A registers with call control provider 120. The call control provider 120 may then provide the group ID D1 (i.e., first block of information) to the peripheral device 130A and also provide testing ID D2 (i.e., second block of information) to multicast over peripheral device's 130A sub-network 150. Since peripheral device 130B is on the same sub-network 150 as peripheral device 130A, peripheral device 130B receives D2. The peripheral device 130B may provide response information including D2 to the call control provider 120 when the peripheral device 130B receives D2. Alternatively, at the next keepalive exchange between peripheral device 130B and the call control provider 120, peripheral device 130B provides D2 to call control provider 120. At this point, the call control provider 120 knows that peripheral devices 130A and 130B are on the same subnetwork and may forward this information to the mapping server 110. The mapping server 110 accordingly adds the peripheral devices 130A and 130B to the multicast map and denotes that the peripheral devices 130A and 130B are on the same network.

Figure 7:
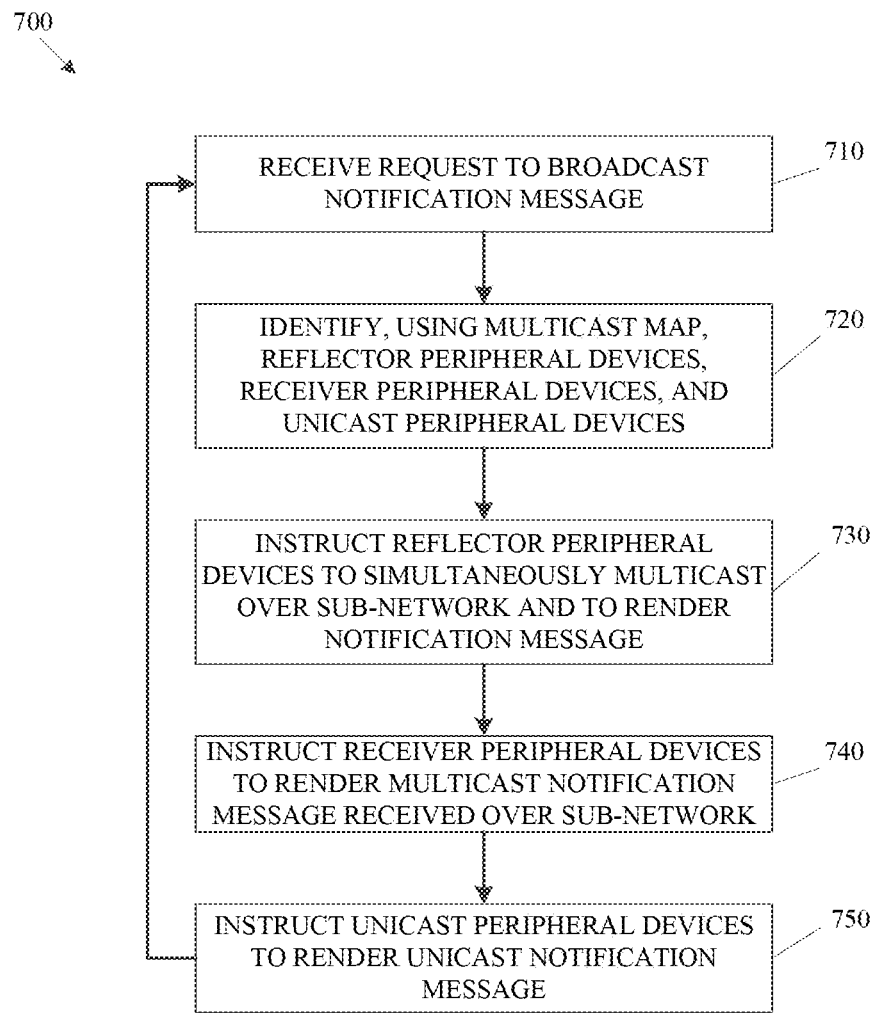
FIG. 7 is a flowchart of a method of multicasting using a multicast map in accordance with some embodiments.

FIG. 7 is a flowchart illustrating a method 700 of multicasting using a multicast map. As illustrated in FIG. 7, the method 700 includes receiving, at the electronic processor 210, a request to broadcast a notification message (at block 710). The electronic processor 210 may receive the request from a peripheral device 130 in the system 100. For example, a security chief of a facility or any other authorized user may want to broadcast an evacuation notification to people within the building. The user may use his peripheral device 130 to initiate the broadcast. The notification message may be, for example, an ad hoc audio, a prerecorded audio, a text message, an e-mail, a telephone call, a push notification, or the like. The user may select the notification message and then request to broadcast the selected notification message on a user interface of the peripheral device 130, for example, using the input/output interface 340. The peripheral device 130 forwards the request with the notification message to the call control provider 120 or the mapping server 110 over the communication network 160.

The method 700 also includes identifying, with the electronic processor 210 using the multicast map, reflector peripheral devices 130, receiver peripheral devices 130, and unicast peripheral devices 130 (at block 720). As described above in method 500, the mapping server 110 generates a multicast map including a mapping of the plurality of peripheral devices 130 of the system 100. The mapping server 110 may also tag peripheral devices 130 in the multicast map as reflector peripheral devices 130, receiver peripheral devices 130, and/or unicast peripheral devices 130. Reflector peripheral devices 130 are capable of both listening to a unicast notification message from the mapping server 110 or the call control provider 120 and also multicasting the notification message over their sub-network 150. Receiver peripheral devices 130 are capable of listening to multicast notification messages that are, for example, multicast by a reflector peripheral device 130 over their respective sub-networks 150. Unicast peripheral devices 130 are capable of listening to unicast notification messages from the mapping server 110 or the call control provider 120. The peripheral devices 130 as such render the notification based on either receiving a unicast stream from the mapping server 110 or call control provider 120 or receiving a multicast stream from another peripheral device 130. The electronic processor 210 accordingly identifies which of the peripheral devices 130 is a reflector peripheral device 130, a receiver peripheral device 130, or a unicast peripheral device 130.

The method 700 further includes instructing, with the electronic processor 210, the reflector peripheral devices 130 to simultaneously multicast the notification message over the sub-network 150 and to render the notification message (at block 730). The electronic processor 210 forwards the instruction to multicast and to render with the notification message to the reflector peripheral devices 130. The reflector peripheral devices 130 then multicast, using the device electronic processor 310, the notification message received from the mapping server 110 or the call control provider 120 over the sub-network 150 such that any other peripheral devices 130 reachable by the reflector peripheral devices 130 receive the notification message. The reflector peripheral device 130 may receive the notification message as a unicast from the mapping server 110 or the call control provider 120. The reflector peripheral device 130 renders and multicasts the notification message simultaneously such that users receive the notification message at the same time from the plurality of peripheral devices 130.

The method 700 also includes instructing, with the electronic processor 210, the receiver peripheral devices 130 to render the multicast notification message received over their sub-network 150 (at block 740). As described above, the reflector peripheral devices 130 multicast the notification message over their respective sub-networks 150. The receiver peripheral devices 130 receive the notification message over the sub-network 150 and render the notification message simultaneously with the reflector peripheral devices 130.

The method 700 also includes instructing, with the electronic processor 210, the unicast peripheral devices 130 to render the unicast notification message (at block 750). The unicast peripheral devices 130 receive the notification message over a unicast stream from the mapping server 110 or the call control provider 120. The unicast peripheral devices 130 render the notification message simultaneously with the reflector peripheral devices 130 and the receiver peripheral devices 130.

As noted above, in some implementations, functionality performed by the mapping server 110 may be distributed among multiple devices or electronic processors. For example, in some embodiments, the multicast mapping described in method 500 may be performed by the mapping server 110, whereas the multicasting using the multicast map as described in method 700 may be performed by call control provider 120 after referring to the multicast map generated by the mapping server 110.

Thus, the invention may provide, among other things, system and method for multicast mapping.

Although the invention has been described in detail with reference to certain preferred embodiments, variations and modifications exist within the scope and spirit of one or more independent aspects of the invention as described.

One or more independent features and/or independent advantages of the invention may be set forth in the claims.

We claim:

1. A system for multicast mapping, the system comprising:
    a plurality of peripheral devices; and
    a mapping server communicating with the plurality of peripheral devices over a communication network, the mapping server having:
        a memory and an electronic processor coupled to the memory, the electronic processor being configured to:
            provide a first block of information to a first peripheral device selected from the plurality of peripheral devices;
            instruct the first peripheral device to multicast the first block of information;
            receive response information from the plurality of peripheral devices;
            determine that response information received from a second peripheral device selected from the plurality of peripheral devices includes the first block of information, wherein the second peripheral device includes the first block of information in the response information received from the second peripheral device in response to receiving the first block of information multicasted from the first peripheral device;
            add the first peripheral device and the second peripheral device to a first sub-network in a multicast map;

receive a request to broadcast a notification message; and broadcast the notification message using the multicast map.

2. The system of claim 1, wherein the electronic processor is further configured to:

determine that response information received from a third peripheral device selected from the plurality of peripheral devices does not include the first block of information;

add the third peripheral device to a second sub-network in the multicast map.

3. The system of claim 2, wherein the electronic processor is further configured to:

provide a second block of information to the plurality of peripheral devices, wherein the response information received from the second peripheral device includes the first block of information and the second block of information, and wherein the response information received from the third peripheral device includes the second block of information.

4. The system of claim 3, wherein the second block of information is a group ID and the first block of information is a testing ID.

5. The system of claim 3, wherein the response information is keepalive information.

6. The system of claim 2, wherein the electronic processor is further configured to:

store the multicast map in a memory of a mapping server.

7. The system of claim 2, wherein, to broadcast the notification message using the multicast map, the electronic processor is further configured to:

identify, using the multicast map, reflector peripheral devices, receiver peripheral devices, and unicast peripheral device from the plurality of peripheral devices;

instruct the reflector peripheral devices to simultaneously multicast the notification message over sub-networks of the reflector peripheral devices and to render the notification message;

instruct the receiver peripheral devices to render the notification message multicast over sub-networks of the receiver peripheral devices; and instruct unicast peripheral devices to render the notification message.

8. The system of claim 1, wherein:

the mapping server includes or is in communication with a call control provider to broadcast the notification message, the notification message includes an audio message, and the first peripheral device and each of at least a portion of the plurality of peripheral devices is at least one selected from the group of a desk telephone, a smart telephone, a web console, an internet protocol speaker, an internet protocol clock, an analog paging device, a computer desktop, an electronic device running an e-mail application, and an electronic device running a social media application.

9. The system of claim 1, wherein:

the mapping server includes or is in communication with a call control provider to broadcast the notification message, the notification message includes an audio message, and the first peripheral device is a telephone.

10. A method of multicast mapping, the method comprising:

providing, with an electronic processor of a mapping server, a first block of information to a first peripheral device selected from a plurality of peripheral devices, the plurality of peripheral devices communicating with the mapping server over communication network;

instructing, with the electronic processor, the first peripheral device to multicast the first block of information;

receiving, with the electronic processor, response information from the plurality of peripheral devices;

determining, with the electronic processor, that response information received from a second peripheral device selected from the plurality of peripheral devices includes the first block of information, wherein the second peripheral device includes the first block of information in the response information received from the second peripheral device in response to receiving the first block of information multicasted from the first peripheral device;

adding, with the electronic processor, the first peripheral device and the second peripheral device to a first sub-network in a multicast map;

receiving a request to broadcast a notification message; and broadcasting the notification message using the multicast map.

11. The method of claim 10, further comprising:

determining that response information received from a third peripheral device selected from the plurality of peripheral devices does not include the first block of information; and adding, with the electronic processor, the third peripheral device to a second sub-network in the multicast map.

12. The method of claim 11, further comprising:

providing, with the electronic processor, a second block of information to the plurality of peripheral devices, wherein the response information received from the second peripheral device includes the first block of information and the second block of information, and wherein the response information received from the third peripheral device includes the second block of information.

13. The method of claim 12, wherein the second block of information is a group ID and the first block of information is a testing ID.

14. The method of claim 12, wherein the response information is keepalive information.

15. The method of claim 12, wherein broadcasting the notification message using the multicast map comprises:

identifying, using the multicast map, reflector peripheral devices, receiver peripheral devices, and unicast peripheral device from the plurality of peripheral devices;

instructing the reflector peripheral devices to simultaneously multicast the notification message over sub-networks of the reflector peripheral devices and to render the notification message;

instructing the receiver peripheral devices to render the notification message multicast over sub-networks of the receiver peripheral devices; and instructing unicast peripheral devices to render the notification message.

16. The method of claim 10, further comprising:

storing the multicast map in a memory of the mapping server.

17. A method of multicast mapping, the method comprising:

providing, with an electronic processor of a mapping server, a first block of information to a first peripheral device selected from a plurality of peripheral devices, the plurality of peripheral devices communicating with the mapping server over communication network;

instructing, with the electronic processor, the first peripheral device to multicast the first block of information;

receiving, with the electronic processor, response information from the plurality of peripheral devices;

determining, with the electronic processor, that response information received from a second peripheral device selected from the plurality of peripheral devices includes the first block of information;

adding, with the electronic processor, the first peripheral device and the second peripheral device to a first sub-network in a multicast map;

receiving a request to broadcast a notification message;

identifying, using the multicast map, reflector peripheral devices, receiver peripheral devices, and unicast peripheral device from the plurality of peripheral devices;

instructing the reflector peripheral devices to simultaneously multicast the notification message over sub-networks of the reflector peripheral devices and to render the notification message;

instructing the receiver peripheral devices to render the notification message multicast over sub-networks of the receiver peripheral devices; and instructing unicast peripheral devices to render the notification message.

18. The method of claim 17, further comprising:

determining that response information received from a third peripheral device selected from the plurality of peripheral devices does not include the first block of information; and adding, with the electronic processor, the third peripheral device to a second sub-network in the multicast map.

19. The method of claim 18, further comprising:

providing, with the electronic processor, a second block of information to the plurality of peripheral devices, wherein the response information received from the second peripheral device includes the first block of information and the second block of information, and wherein the response information received from the third peripheral device includes the second block of information.

20. The method of claim 19, wherein the response information is keepalive information.

* * * * *